E. F. SPAULDING.
Stop-Cocks.
No. 141,471.        Patented August 5, 1873.
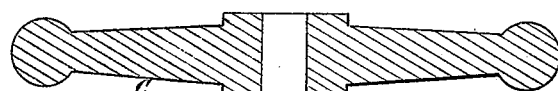
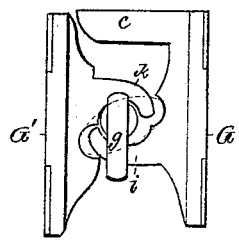
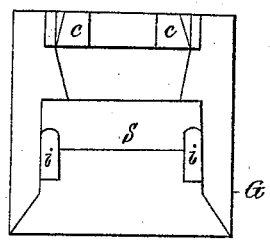
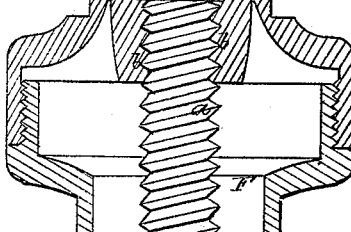
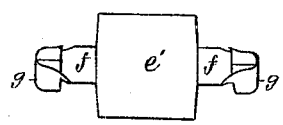
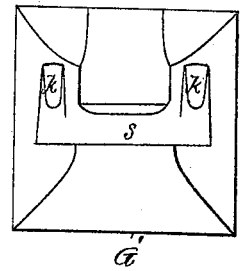
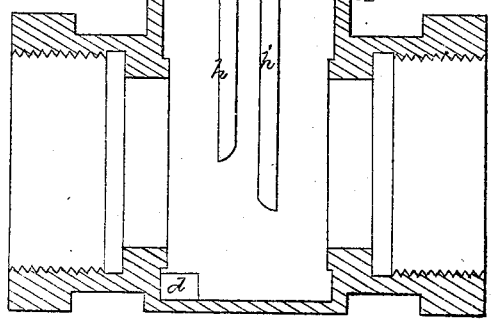
Witnesses
Geo Gray
F. C. Hale
E. Frank Spaulding
by his attorney
F. P. Hale

UNITED STATES PATENT OFFICE.

E. FRANK SPAULDING, OF CAMBRIDGEPORT, MASSACHUSETTS.

IMPROVEMENT IN STOP-COCKS.

Specification forming part of Letters Patent No. 141,471, dated August 5, 1873; application filed April 26, 1873.

*To all whom it may concern:*

Be it known that I, E. FRANK SPAULDING, of Cambridgeport, in the county of Middlesex and State of Massachusetts, have invented a new and useful Improvement in Valves for Steam, Water, &c., of which the following is a specification:

My invention has reference to that class of stop cocks or valves, in which two independent disks or valve-plates are employed to close upon two opposite seats disposed upon the inner faces of the induction and eduction ports of the water or steam passage. The object of my invention is to provide a simple, durable, and effective valve, one not only easily operated, but one free from the great friction and wear of the seats of the shell and faces of the disks incident to the operating and closing of many valves, as ordinarily constructed; and my invention consists in the peculiar construction of the valve-disks, their operating-wedge and guides, and their construction and arrangement with respect to each other, as hereinafter described and claimed.

In the drawing, Figure 1 denotes a central, vertical, and longitudinal section of a valve, constructed in accordance with my invention. Fig. 2, a vertical section of the valve-case, taken so as to show one pair of the guide-ribs. Fig. 3 is an edge view of the disks and their operating-wedge. Figs. 4 and 5 are inside views of the two disks. Fig. 6 is a side view of the wedge.

In the said drawing, A denotes the case or shell of the valve, through which a straight passage for the flowage of steam, water, &c., is made. B is the stem, which is provided at its upper end with a hand-wheel, C. The said stem extends down through the stuffing box or cap D, the neck E, and chamber F, and has a male screw, *a*, cut upon it, as shown in Fig. 1, such screw operating with a female screw, *b*, within the bonnet or neck E. *e* is an annular shoulder made upon the stem at its lower end. G G' are two valve disks or plates, their inner faces having the peculiar shape, as shown in Figs. 3, 4, and 5, the disk G having ears *c c*, by which it is connected with the stem of the valve. *e'* is a wedge or lever having cylindrical projections *f f* extending from its extremities, and having formed on their ends lugs or arms *g g*, arranged at right angles thereto, and diagonally to the plane of the wedge, their arms turning in guides, or between vertical ribs *h h* and *h' h'*, disposed on the sides of the shell, one pair of such ribs being shown in Fig. 2. The ribs *h h*, on one side of the shell, are shorter than their fellows on the opposite side, the object of such construction being to allow the arms *g g*, when the disk G' has reached its lowest point and resting upon the lug *d* on the bottom of the fluid passage, to be free from control of the ribs, and allow the wedge, when the disk G is pressed farther down, to turn and be brought nearer to a horizontal position, and thus force the disks outward against their seats. *i i* are two curved arms formed on the inner face of the disk G. K K are similar arms disposed in reverse direction on the disk G', these arms serving to support the wedge and allow its journals to turn within the same. The said wedge, at each of its edges, is of a curved or convex shape, and extends into chambers or sockets S S, formed in the inner faces of the disks, as shown in Figs. 1, 4, and 5, the chambers being so disposed, with respect to each other, as to cause the wedge to stand diagonally to the faces of the disks, in order that when one of the disks, viz., G', (which is so arranged as to move in advance of its fellow,) shall have reached its lowest position, (viz., resting upon the lug *d*,) the farther descent of the disk G will cause the wedge to approach nearer to a horizontal plane, and thus force asunder the disks and close them upon their seats with any desired degree of force.

By constructing the wedge with arms *g g*, to run in grooves or ways formed in the interior of the valve-case, as stated, the two disks are so controlled in their ascent and descent, as not only to prevent any "setting" thereof, but their faces are kept from impact against their seats until they have reached their lowest position, when they are forced laterally against their seats.

Having thus described my invention, what I claim is—

In a valve, substantially as described, the combination of the disks G G', the wedge *e'*, and ribs *h h*, constructed and arranged for conjoint operation, as specified.

E. FRANK SPAULDING.

Witnesses:
F. P. HALE,
F. C. HALE.